(12) United States Patent
Steely, Jr. et al.

(10) Patent No.: US 7,376,794 B2
(45) Date of Patent: May 20, 2008

(54) COHERENT SIGNAL IN A MULTI-PROCESSOR SYSTEM

(75) Inventors: Simon C. Steely, Jr., Hudson, NH (US); Gregory Edward Tierney, Chelmsford, MA (US); Stephen R. Van Doren, Northborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 486 days.

(21) Appl. No.: 10/756,636

(22) Filed: Jan. 13, 2004

(65) Prior Publication Data

US 2005/0154833 A1    Jul. 14, 2005

(51) Int. Cl.
G06F 9/00 (2006.01)
G06F 9/38 (2006.01)
G06F 13/00 (2006.01)

(52) U.S. Cl. ............... 711/141; 711/146; 711/118; 711/117; 711/100; 712/217; 712/216; 712/1

(58) Field of Classification Search ............ None
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,491,811 A * | 2/1996 | Arimilli et al. | 711/144 |
| 5,519,841 A | 5/1996 | Sager et al. | |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,958,019 A | 9/1999 | Hagersten et al. | |
| 6,032,231 A | 2/2000 | Gujral | |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,134,646 A | 10/2000 | Feiste et al. | |
| 6,151,671 A | 11/2000 | D'Sa et al. | |
| 6,209,065 B1 | 3/2001 | Van Doren et al. | |
| 6,275,905 B1 * | 8/2001 | Keller et al. | 711/141 |
| 6,286,090 B1 | 9/2001 | Steely, Jr. et al. | |
| 6,301,654 B1 | 10/2001 | Ronchetti et al. | |

(Continued)

OTHER PUBLICATIONS

M. Lipasti, C. Wilkerson, and J. Shen. Value locality and load value prediction. In Proceedings of the 7th ASPLOS, Boston, MA, Oct. 1996.*

(Continued)

*Primary Examiner*—Sanjiv Shah
*Assistant Examiner*—Sam Dillon (57) ABSTRACT

Multi-processor systems and methods are disclosed. One embodiment may comprise a multi-processor system comprising at least one data fill provided to a source processor in response to a source request by the source processor, and a coherent signal generated by the multi-processor system that provides an indication of which data fill of the at least one data fill is a coherent data fill.

26 Claims, 8 Drawing Sheets

U.S. PATENT DOCUMENTS

| | | | |
|---|---|---|---|
| 6,317,811 B1 | 11/2001 | Deshpande et al. | |
| 6,345,342 B1 | 2/2002 | Arimilli et al. | |
| 6,349,382 B1 | 2/2002 | Feiste et al. | |
| 6,356,918 B1 | 3/2002 | Chuang et al. | |
| 6,408,363 B1 | 6/2002 | Lesartre et al. | |
| 6,412,067 B1 | 6/2002 | Ramirez et al. | |
| 6,457,101 B1 | 9/2002 | Bauman et al. | |
| 6,493,802 B1 * | 12/2002 | Razdan et al. | 711/144 |
| 6,535,941 B1 | 3/2003 | Kruse | |
| 6,553,480 B1 | 4/2003 | Cheong et al. | |
| 6,574,712 B1 | 6/2003 | Kahle et al. | |
| 6,591,348 B1 | 7/2003 | Deshpande et al. | |
| 6,594,821 B1 | 7/2003 | Banning et al. | |
| 6,615,343 B1 | 9/2003 | Talcott et al. | |
| 6,633,960 B1 | 10/2003 | Kessler et al. | |
| 6,633,970 B1 * | 10/2003 | Clift et al. | 712/217 |
| 6,651,143 B2 | 11/2003 | Mounes-Toussi | |
| 6,775,749 B1 * | 8/2004 | Mudgett et al. | 711/146 |
| 7,234,029 B2 * | 6/2007 | Khare et al. | 711/146 |
| 2001/0055277 A1 | 12/2001 | Steely, Jr. et al. | |
| 2002/0009095 A1 | 1/2002 | Van Doren et al. | |
| 2002/0099833 A1 | 7/2002 | Steely, Jr. et al. | |
| 2002/0099913 A1 | 7/2002 | Steely, Jr. | |
| 2002/0146022 A1 | 10/2002 | Van Doren et al. | |
| 2002/0194290 A1 | 12/2002 | Steely, Jr. et al. | |
| 2002/0194436 A1 | 12/2002 | McKenney | |
| 2002/0199067 A1 * | 12/2002 | Patel et al. | 711/145 |
| 2003/0069902 A1 | 4/2003 | Narang et al. | |
| 2003/0145136 A1 | 7/2003 | Tierney et al. | |
| 2003/0195939 A1 | 10/2003 | Edirisooriye et al. | |

OTHER PUBLICATIONS

J. Handy, The Cache Memory Book. New York: Academic, 1993.*

L. Kontothanassis and M. Scott, "High Performance Software Coherence for Current and Future Architectures," Journal for Parallel and Distributed Computing, 1995.*

Kozyrakis, C.E. Vector IRAM: ISA and Micro-architecture. IEEE Computer Elements Workshop, Vail, CO, Jun. 21-24, 1998.*

□□M. Cintra, J. F. Martnez, and J. Torrellas. Architectural support for scalable speculative parallelization in shaped-memory multiprocessors. In Proceedings of the 27th Annual International Symposium on Computer Architecture, Jun. 2000.*

Rajiv Gupta. The Fuzzy Barrier: a mechanism for high speed synchronization of processors. Proceedings of the third international conference on Architectural support for programming languages and operating systems. Apr. 3-6, 1989.*

Sato, T.; Ohno, K.; Nakashima, H. A mechanism for speculative memory accesses following synchronizing operations. Parallel and Distributed Processing Symposium, 2000. IPDPS 2000. Proceedings. 14th International.*

Handy, Jim. The Cache Memory Book. Academic Press Inc. 1998. pp. 159.*

Gharachorloo, et al., "Memory Consistency and Event Ordering in Scalable Shared-Memory Multiprocessors", Computer Systems Laboratory, Standard University, CA 94305, pp. 1-14.

Gharachorloo, et al., "Architecture and Design of AlphaServer GS320", pp. 1-16.

* cited by examiner

COHERENT SIGNAL IN A MULTI-PROCESSOR SYSTEM

CROSS REFERENCE TO RELATED APPLICATIONS

This application is related to the following commonly assigned patent applications entitled: "MULTI-PROCESSOR SYSTEMS AND METHODS FOR BACKUP FOR NON-COHERENT SPECULATIVE FILLS," application Ser. No. 10/756,637; "CACHE SYSTEMS AND METHODS FOR EMPLOYING SPECULATIVE FILLS," application Ser. No. 10/756,638; "REGISTER FILE SYSTEMS AND METHODS FOR EMPLOYING SPECULATIVE FILLS," application Ser. No. 10/756,644; "SYSTEMS AND METHODS FOR EXECUTING ACROSS AT LEAST ONE MEMORY BARRIER EMPLOYING SPECULATIVE FILLS," application Ser. No. 10/756,639; "MULTI-PROCESSOR SYSTEM UTILIZING SPECULATIVE SOURCE REQUESTS," application Ser. No. 10/756,640; "MULTI-PROCESSOR SYSTEM RECEIVING INPUT FROM A PRE-FETCH BUFFER," application Ser. No. 10/756,535; "SOURCE REQUEST ARBITRATION," application Ser. No. 10/755,919; "SYSTEMS AND METHODS FOR EMPLOYING SPECULATIVE FILLS," application Ser. No. 10/755,938; "CONSISTENCY EVALUATION OF PROGRAM EXECUTION ACROSS AT LEAST ONE MEMORY BARRIER," application Ser. No. 10/756,534, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

SUMMARY

One embodiment of the present invention may comprise a multi-processor system. The multi-processor system may comprise at least one data fill provided to a source processor in response to a source request by the source processor, and a coherent signal generated by the multi-processor system that provides an indication of which data fill of the at least one data fill is a coherent data fill.

Another embodiment of the present invention may comprise a system that includes a plurality of processor nodes in communication with each other. The system may include a source processor node that issues a source request to the system, and receives a plurality of data responses to the source request. The system can employ a protocol that causes the system to provide a coherent signal that indicates as to which of the plurality of data responses contains coherent data.

Still another embodiment of the invention may comprise a method that may comprise transmitting a source request for data from a source node to other nodes of an associated multi-processor system. The method may further include providing at least one copy of data in response to the source request and providing a coherent signal to the source node that indicates which of the at least one copy of data is coherent.

DETAILED DESCRIPTION

This disclosure relates generally to multi-processor communication systems and methods. The systems and methods may employ a coherent signal that is separate from a data fill associated with a response to a source request. A data fill refers to a copy of a memory block associated with a given cache line. The coherent signal indicates which of one or more copies of a data fill returned in response to a source request is a coherent copy of the data. A coherent copy of data is a copy that is determined to be the latest or most up to date version. The source processor can empoly one or more speculative fills or copies of the requested data to continue instruction execution, until the coherent signal is returned. Once the coherent signal is returned, the source can continue execution if the speculative fill is the same as the coherent fill or backup and re-execute instructions if the speculative fill is different from the coherent fill. The systems and methods can be employed in multi-processor system utilizing a cache coherency protocol. The coherent signal can be part of or work in cooperation with the cache coherency protocol.

Figure 1:
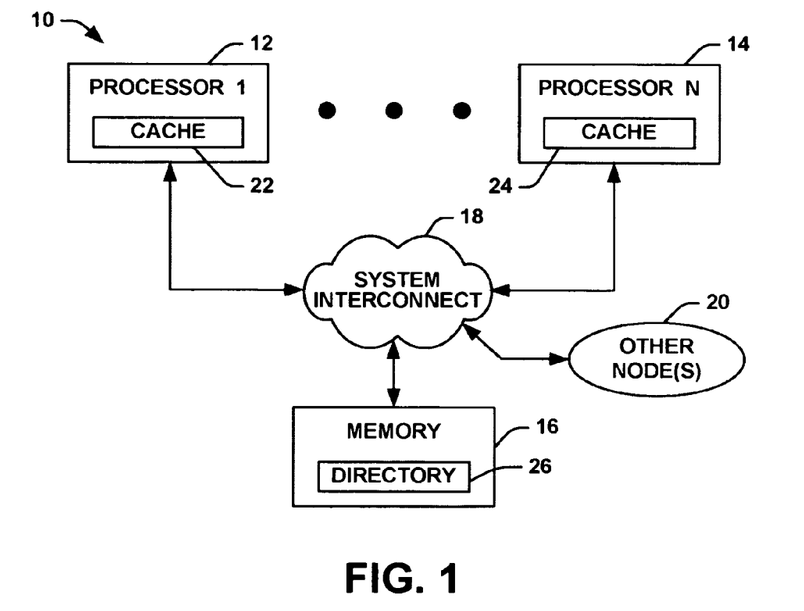
FIG. 1 depicts an example of a multiprocessor system.

FIG. 1 depicts an example of a system 10 that can utilize a coherent signal to indicate which of one or more data fills returned in response to a source request is coherent. Additionally, the system 10 can utilize a coherent signal to indicate which portion (e.g., field, block, quantum) of a given data fill is coherent. Furthermore, the system 10 can employ a coherent signal to indicate which of a plurality of responses to a plurality of requests have returned coherent copies of data fills. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12-14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22-24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to guarantee coherence of data. The cache coherency protocol of the system 10 utilizes a plurality of states to identify the state of each memory block stored in a respective cache line and the memory 16. The coherency protocol establishes rules for transitioning between states, such as if data is read from or written to memory 16 or one of the caches 22-24.

As used herein, a node that issues a source request, such as a read or write request, defines a source node. Other nodes within the system 10 are potential targets of the request. Additionally, each memory block in the system 10 can be assigned a "home node" that maintains necessary global information and a data value for that memory block. The home node can be defined as a processor (or central processing unit), associated cache and associated memory/directory.

For example, when a source node, such as the processor 12, requires a copy of a given memory block, it typically first requests the memory block from its local, private cache by identifying the address associated with the memory block. If the data is found locally, the memory access is resolved without communication via the system interconnect 18. Where the requested memory block is not found locally, the source node 12 can request the memory block from the system 10, including the memory 16. In addition to the request identifying an address associated with the requested memory block, the request usually identifies the type of request or command being issued by the requester.

By way of example, assume that the processor 12 (a source node) requires a copy of data associated with a particular address, and assume that the data is unavailable from its own local cache 22. Since the processor 12 is unable to access the data in its local cache 22, the processor 12, as the source node, transmits a source request to other nodes and memory 16 via the system interconnect 18. For example, the request can correspond to a source read request for a memory block associated with the address identified in the request. The request also can identify what type of request is being issued by source node 12.

In a directory based cache coherency protocol, the source request is transmitted from the source processor 12 to a home node in the system 10. The home node retains location information (e.g., in a directory) of the owner of the requested cache line. The home node provides a forward signal to the owner. The owner then responds with a coherent data fill, which is received by the requester. The system 10 also returns a coherent signal indicating that the coherent data fill is the coherent copy. The coherent signal can be provided before, after or concurrently with the coherent data fill. Based on the type of request, the cache coherency protocol can continue executing to change states of one or more copies of the memory block in the system.

During execution of the cache coherency protocol, the requesting node is provided with one or more data fills associated with the memory block. The data fill is a copy of the memory block associated with a requested cache line. The data fill can be a speculative fill. A speculative fill is a data fill that may or may not be the latest version of the memory block. Speculative fills can be provided by a local cache, a local processor (e.g., within a multi-processor group), a remote processor, a home node or a speculative guess structure. The speculative guess structure can be implemented by employing a speculative table, speculative engine or separate cache structure that maintains speculative copies of memory blocks. The speculative fills allow the requesting processor to execute several thousands of program instructions ahead prior to receiving a coherent copy of the requested memory block.

Subsequent data fills can be provided to the requesting node until the coherent signal is received indicating which data fill is coherent. These subsequent data fills can be ignored. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

Once the coherent signal is received, the source processor can determine whether the current speculative fill employed by the processor to continue execution is the same as the coherent data fill. If the coherent data fill is different from the speculative fill, the processor can back up and re-execute program instructions with the new data. If the coherent data fill is the same as the speculative fill, the processor can continue execution, thus mitigating latency caused by the processor remaining in an idle state until a coherent version of the requested memory block is received.

Figure 2:
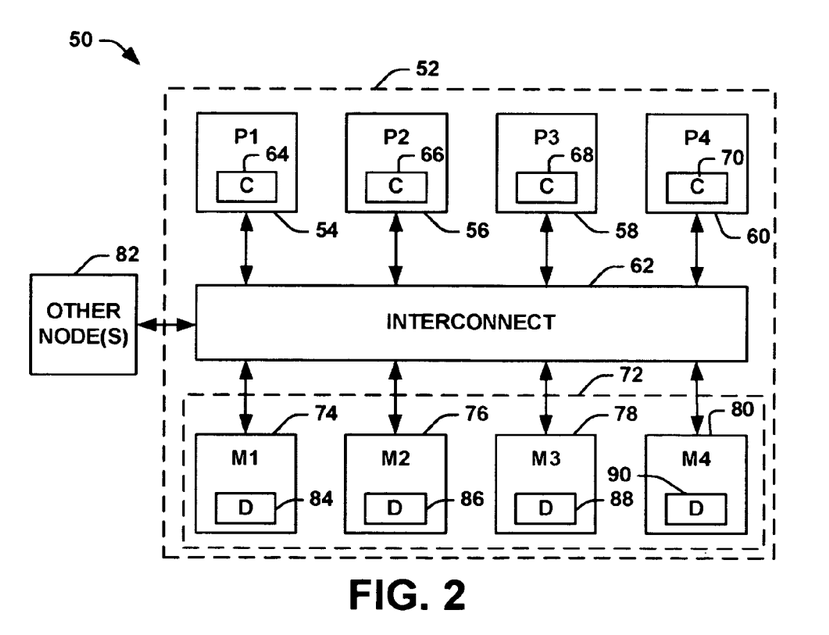
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54-60 are depicted in the example of FIG. 2, those skilled in the art will appreciate that a greater or smaller number of processors can be implemented in the node 52.

Each processor 54-60 also includes an associated cache 64, 66, 68 and 70. The caches 64-70 can enable faster access to data than from an associated main memory 72 of the node 52. The system 50 implements a cache coherency protocol designed to guarantee coherency of data in the system. By way of example, the cache coherency protocol can be implemented to include a source broadcast protocol in which requests for data are transmitted to a home node, which retains owner information in a directory associated with a given cache line.

The memory 72 can include multiple memory modules (M1, M2, M3, M4) 74, 76, 78 and 80. For example, the memory 72 can be organized as a single address space that is shared by the processors 54-60 as well as other nodes 82 of the system 50. Alternatively, each memory module 74-80 can be associated with a respective one of the processors 54-60. Each of the memory modules 72-78 can include a corresponding directory 84, 86, 88 and 90 that defines how the memory blocks are apportioned in each respective module as well as where the corresponding coherent copy of data should reside in the system 50. The coherent copy of data, for example, may reside in the home memory module or, alternatively, in a cache of one of the processors 54-60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54-60 and the memory 70, as well as those to and from the other nodes 82.

When a processor 56 requires desired data, the processor 56 operates as a source node and issues a source request (e.g., a read request or write request) to the system 50. In a directory based protocol, a home node responds to the request by providing a forwarding signal to an owner processor. The owner processor returns a coherent copy of the data fill. The cache coherency protocol implemented in the system 50 is designed to ensure that a correct copy of the data is returned in response to the source request. The system 50 also returns a coherent signal that indicates that the copy returned from the owner processor is the coherent version of the requested data.

Furthermore, the source processor can receive speculative copies or fills of the requested data in response to the source request. The source processor can employ the speculative copy to execute several thousands of instructions ahead prior to receiving a coherent version of the data. Speculative fills can be provided by a local processor (e.g., within a multi-processor group), a remote processor, a home node or a speculative guess structure, such as a speculative table, speculative engine or separate cache structure that maintains speculative copies of memory blocks. Subsequent data fills can be provided to the requesting node until the coherent signal is received indicating which data fill is coherent. These subsequent data fills can be ignored. Alternatively, if a subsequent data fill is different from the speculative fill used by the source processor to continue execution, the processor can backup and re-execute program instructions. This may be the case if it is determined that a subsequent fill is more likely coherent than the original fill employed by the processor to continue execution.

Once the coherent signal is received, the source processor can determine whether the current speculative fill employed by the source processor to continue execution is the same as the coherent data fill. If the coherent data fill is different from the speculative fill, the processor can back up and re-execute program instructions with the new data. If the coherent data fill is the same as the speculative fill, the processor can continue execution of new program instructions.

Figure 3:
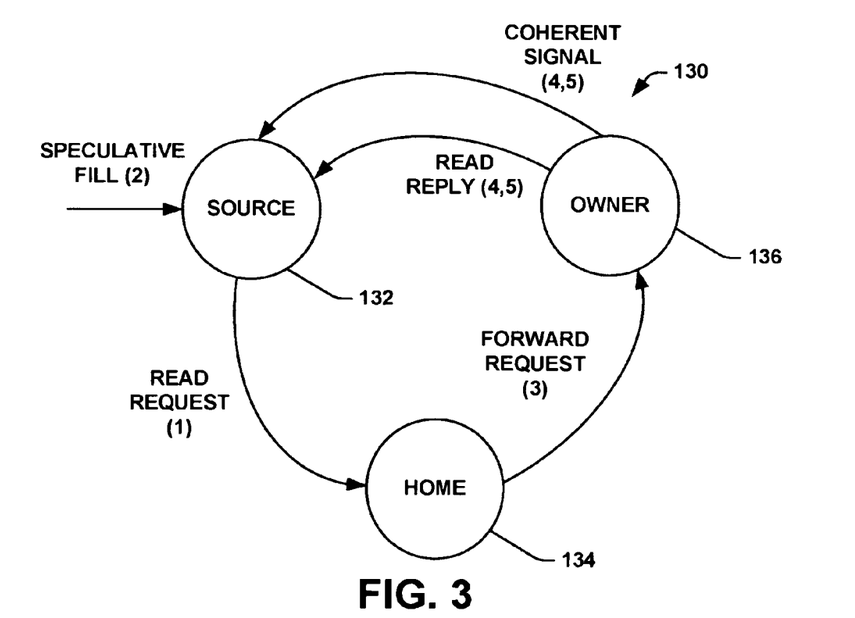
FIG. 3 illustrates a system diagram associated with a source read request.

FIG. 3 illustrates a system diagram 130 associated with a source read request in the event of a cache miss in a multi-processor system. The system diagram includes reference numerals (1-5) that indicate one or more communication orders associated with the system diagram. A source node or processor 132 initiates a read request, which is received by a home node 134. The home node 134 retains information indicating the owner of the requested cache line. This information is stored in a directory in memory associated with the home node 134. The source read request is also received by one or more other entities and/or structures of the multi-processor system. For example, one or more local processors (e.g., a processor part of a multi-processor group or node), a remote processor, or some other local or remote structure residing in a multi-processor group with the source. At least one or more of these other entities and/or structures provide copies of the requested cache line to the source. The copies of the requested cache line are referred to as speculative fills, since it is not known at this time whether or not these copies are coherent. One of the speculative fill are employed by the source processor to continue executing its program instructions.

The multi-processor system continues execution of its cache coherency protocol, while the source processor executes with the speculative fill. The home node 134 determines the owner 136 of the cache line requested from a home directory. The owner 136 of the cache line is the node or processor that has the latest version of the cache line. The latest version of the cache line can reside in a cache associated with a local or remote processor, or the latest version of the cache line can reside in memory. The owner can be a cache associated with a processor or a memory associated with the system or one or more processors. The home node 134 then provides a forward request to the owner 136. The owner 136 provides a read reply by providing a coherent copy of the requested data associated with the requested cache line to the source 132.

A coherent signal is provided to the source. The coherent signal is an indicator that provides an indication to the source that the copy provided by the owner is the coherent version of the cache line. In the example of FIG. 3, the coherent signal is provided by the owner. However, the coherent signal can be provided by control logic associated with the multi-processor system, by the home node 136 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

In response to the source receiving the coherent signal, a comparison is performed of the coherent fill and the speculative fill employed by the source to continue program execution. If the coherent data fill is different from the speculative fill, the source can back up and re-execute program instructions with the new data. If the coherent data fill is the same as the speculative fill, the source can continue execution of program instructions, which can be several thousand instructions ahead of where the program would be without employing the speculative fill.

Figure 4:
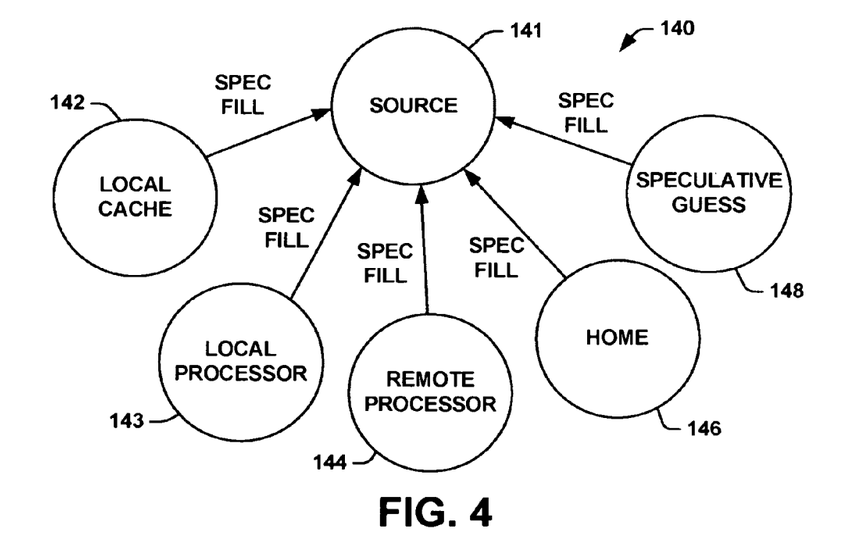
FIG. 4 illustrates a system diagram associated with a source node or processor receiving speculative fills.

FIG. 4 illustrates a system diagram 140 associated with a source node or processor 141 receiving speculative fills in response to a source request in the event of a cache miss in a multi-processor system. The source node or processor 141 can receive speculative fills from a local cache 142. The local cache 142 may have a copy of the memory block, which may or may not be the same as the coherent version residing somewhere in the multi-processor. This can occur in an upgrade miss, which by definition means that there is already a copy of the memory block in the local cache 142, such that the copy of the memory block can serve as a speculative fill. When the upgrade miss returns, a coherent signal will occur if the upgrade occurred to the value that was already present in the cache. If a new value is obtained, the new value will cause the source 141 to backup and re-execute program instruction with the new value. Another example, is a full-block write where by definition all data values in a memory block associated with a cache line are going to be written by the execution stream. In this example, the system returns an acknowledgement that the line is coherent (all other copies have been invalidated). Similar to upgrade misses, the source begins executing upon receiving a full-block miss. When the system returns a coherent signal, the coherent signal is passed to the source 141 to allow instructions to start retiring.

The source node or processor 141 can receive speculative fills from a local processor 143. A local processor 143 is a processor that is within a node or multi-processor group with the source 141. The local processor 143 may have a copy of the cache line in its cache, which may be a stale version or a coherent version. The local processor 143 can provide this copy in the form of a speculative fill to the source. Additionally, a speculative fill can be provided by a remote processor 144 that can provide a speculative fill prior to the time necessary in providing the coherent fill. A remote processor is a processor that is not within a node or multi-processor group with the source 141. A home node 146 or processor can also provide a speculative fill.

The multi-processor system can also include a speculative guess structure 148 operative to provide speculative fills. For example, the speculative guess structure 148 can be a speculative engine can be employed to provide speculative fills in response to source requests. The speculative engine can be a dedicated processor and/or memory that returns speculative copies of cache lines. The speculative guess structure 148 can be a storage structure local to the source processor 141 that maintains speculative copies of cache lines in a table or some other form. The speculative guess structure 148 can monitor cache copies transmitted over the system, such that the speculative fills are similar to a substantial portion of the coherent fills transmitted over the system.

Figure 5:
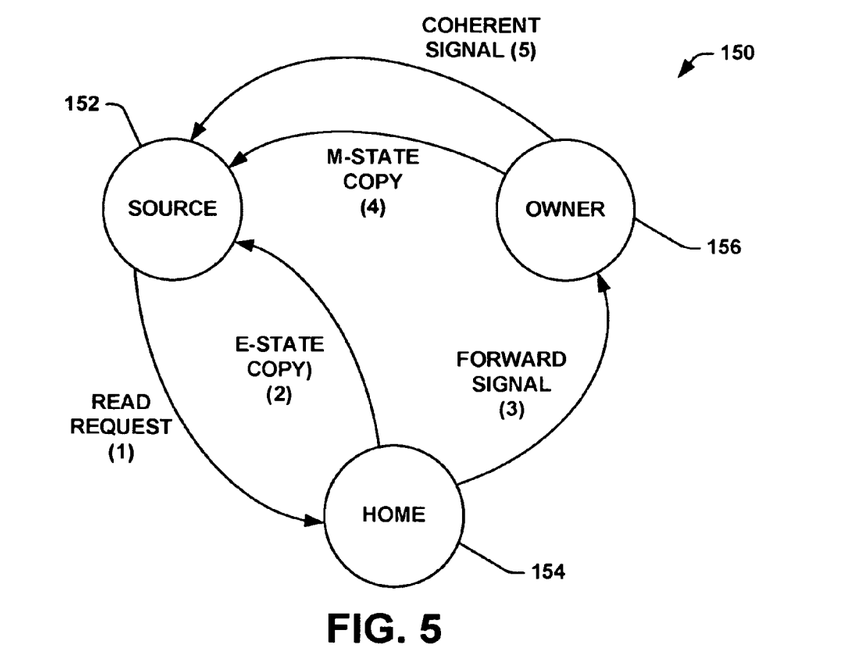
FIG. 5 illustrates a system diagram associated with a source node or processor receiving a speculative fill from a home node.

FIG. 5 illustrates a system diagram 150 associated with a source node or processor 152 receiving a speculative fill from a home node 154 when a cache line is determined to be in an exclusive (E) state at the home node 154. The system diagram includes reference numerals (1-5) that indicate one or more communication orders associated with the system diagram. The source 152 initiates a read request, which is received by the home node 154. The home node 154 retains information indicating an owner 156 of the requested cache line. The home node 154 can retain a copy of the requested cache line in addition to retaining owner information associated with the cache line. If the copy of the cache line is in the E-state, the home node 154 knows that the owner 156 has exclusive ownership of the cache line. An E-state refers to a cache line state in which a single processor controls the only copy of a cache line in the system given the owner 156 the exclusive right to modify the data fill associated with the cache line. Since the data is in determined to be in the E-state by the home 154, the home 154 can provide a copy of the data fill to the source and provide a forward signal to an owner 156. However, since the home 154 does not know if the owner 156 has modified the memory block associated with the cache line, the data fill is speculative.

If the owner 156 modifies the cache line prior to receiving the forward signal from the home 154, the cache line is changed to the modify (M)-state, and the M-state copy is provided to the source 152 by the owner 156. A coherent signal is provided to the source 152 to indicate that the M-state copy is the coherent version of the requested cache line. In the example of FIG. 5, the coherent signal is provided by the owner. However, the coherent signal can be provided by the control logic associated with the multi-processor system, by the home node 154 or by some other structure in the multi-processor system. If the owner does not modify the cache line, only the coherent signal is provided to the source 152. The source 152 knows that if a new fill is received with the coherent signal that the new fill is the coherent fill. The source 152 also knows that if the coherent signal is received without a new fill, that the speculative fill is coherent. The source 152 continues execution of program instructions or re-executes program instructions with the new fill accordingly without the need to compare the speculative fill with the coherent fill.

Figure 6:
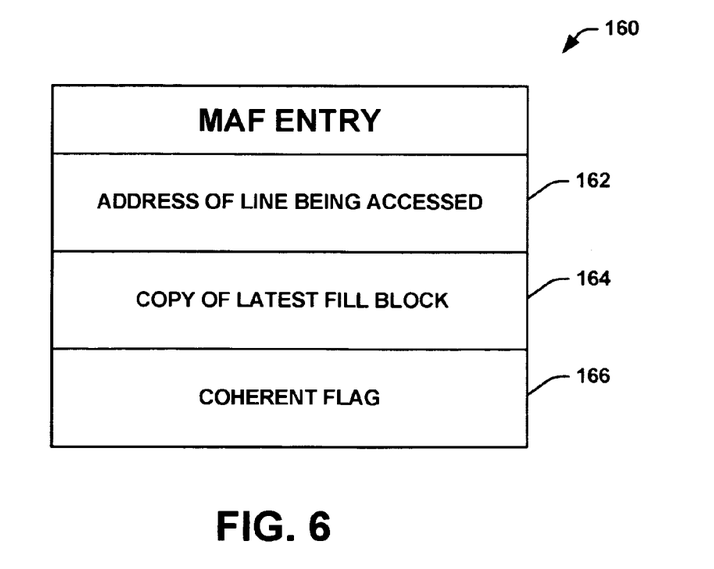
FIG. 6 illustrates a block diagram of a miss address file (MAF) entry.

FIG. 6 illustrates a block diagram of a miss address file (MAF) entry 160 that can be employed to track data fills received in response to a source request. A MAF entry is generated by a source each time a source broadcasts a request over the system. The MAF entry 160 contains fields associated with an outstanding request for a respective cache line. The MAF fields can include the cache line address being requested 162, the copy of the latest fill block 164 returned by the system and a flag 166 that provides an indication of whether or not the coherent signal has been received. Other entries or fields can be employed to maintain information associated with a given cache line broadcast request. Each time a new fill is received, the source determines if the data fill in the MAF entry 160 is the same as the speculative fill utilized by the source to continue execution. If the new fill is different, the source replaces the previous data fill with the new fill. If the subsequent data fill is different from the speculative fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 166 has changed indicating that the coherent signal has been received. Once the coherent flag 166 changes state, the source can compare the coherent fill 164 stored in the MAF entry 160 with the speculative fill used to continue execution of the processor to determine if execution should continue or whether the processor needs to re-execute the program instructions.

Figure 7:
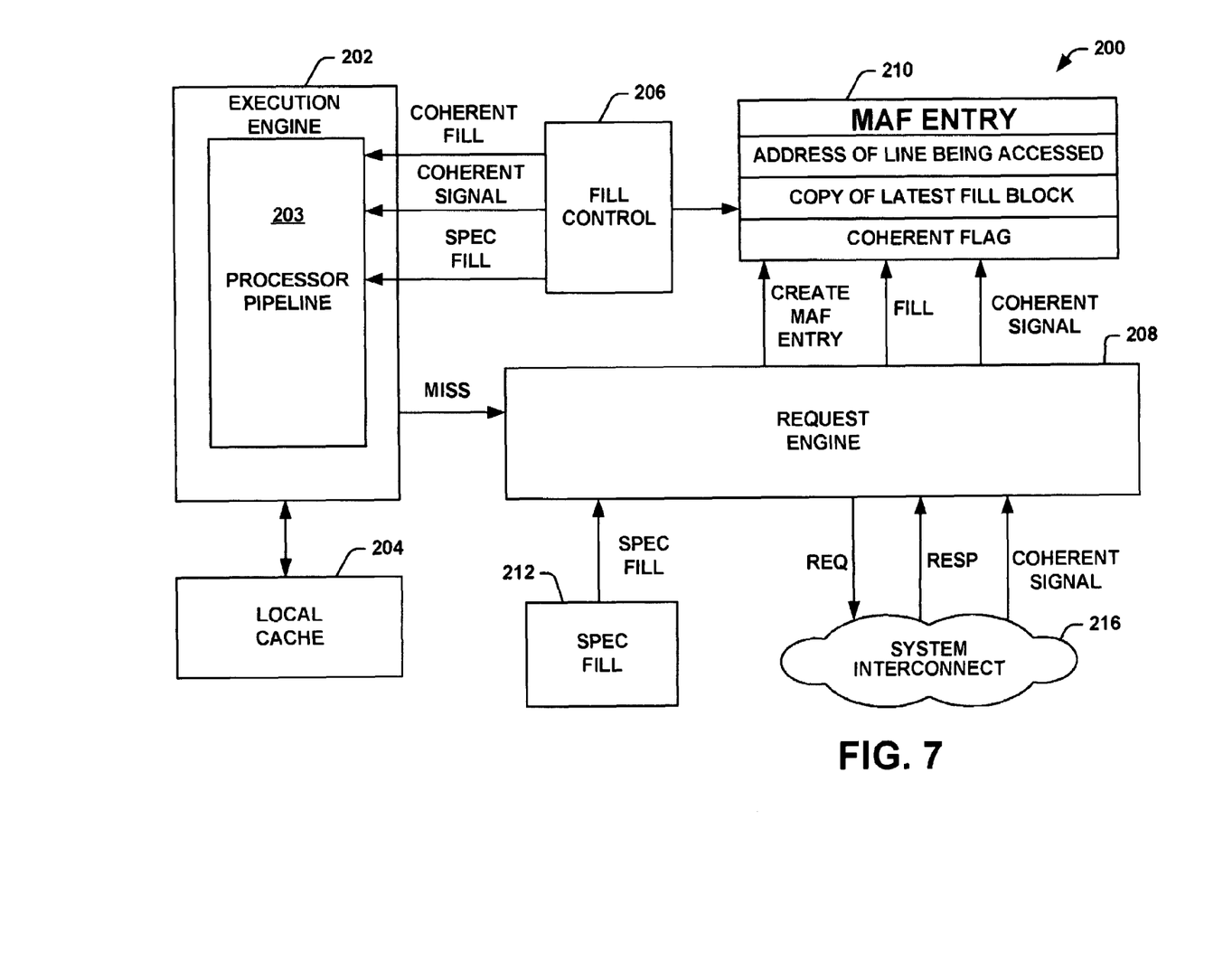
FIG. 7 depicts an example of a processor system.

FIG. 7 illustrates a processor system 200 that employs a MAF entry. The system 200 includes an execution engine 202 that is executing instructions associated with a processor pipeline 203. During a load or store instruction, the execution engine 202 searches a local cache 204 to determine if the cache line resides in the local cache 204. If the cache line does not reside in the local cache 204, the execution engine 202 initiates a miss to a request engine 208. The request engine 208 creates a MAF entry 210 and generates a source request over the system via a system interconnect 216. The MAF entry 210 can be implemented as a table, an array, a linked list or other data structure programmed to manage and track requests for each cache line. The MAF entry 210 includes fields that identify, for example, the address of the data being requested, the type of request, and response information received from other nodes in response to the request. The request engine 208 thus employs the MAF entry 210 to manage requests issued by the request engine 208 as well as responses to such requests.

A speculative fill is provided to the request engine by a speculative fill structure 212 in response to the source broadcast. The speculative fill structure 212 can be a tagless relatively large cache-like structure local or remote to the system 200. If the speculative fill structure 212 has a substantial number of entries (e.g., 32 times more entries than the local cache 204), the speculative fill structure 212 will have relatively good accuracy and a large number of speculative fills will be coherent. The entries in the speculative fill structure can be obtained by monitoring cache lines transmitted over the multi-processor system.

The speculative fill is stored in a copy of latest fill block field in the MAF entry 210 via the request engine 208. A fill control component 206 retrieves a copy of the speculative fill from the MAF entry 210 and provides the speculative fill to the processor pipeline 203. The processor pipeline 203 employs the speculative fill to continue execution of program instructions. As new fills are received from the system, the request engine 208 continues storing the new fills in the copy of latest fill block field of the MAF entry 210 overwriting the previous fills. These subsequent data fills can be ignored. Alternatively, if the subsequent data fill is different from the speculative fill used by the source processor to continue execution, the processor backup and re-execute program instructions. This may be the case if it is determined that a subsequent fill is more likely coherent than the original fill employed by the processor to continue execution.

The fill control component 206 monitors a coherent flag field in the MAF entry 210 to determine if the coherent flag has changed state, which is an indication that the coherent signal has been received. Once the coherent signal is received from the system, the request engine 208 changes the state of the coherent flag field in the MAF entry 210.

The fill control 206 detects the change in the state of the coherent fill and retrieves a copy of the latest fill block, which corresponds to the coherent version of the data fill. The fill control 206 then compares the speculative fill provided by the fill control 206 to the processor pipeline 203 with the coherent fill. If the coherent data fill is different from the speculative fill, the fill control 206 provides the coherent fill to the processor pipeline 203. The processor pipeline 203 can back up and start executing program instructions again with the new coherent data. If the coherent data fill is the same as the speculative fill, the fill control 206 provides the coherent signal to the processor pipeline 203 indicating that the processor pipeline 206 has already been provided with the coherent data. The processor pipeline 203 can continue execution, until another load or store instruction is encountered.

Figure 8:
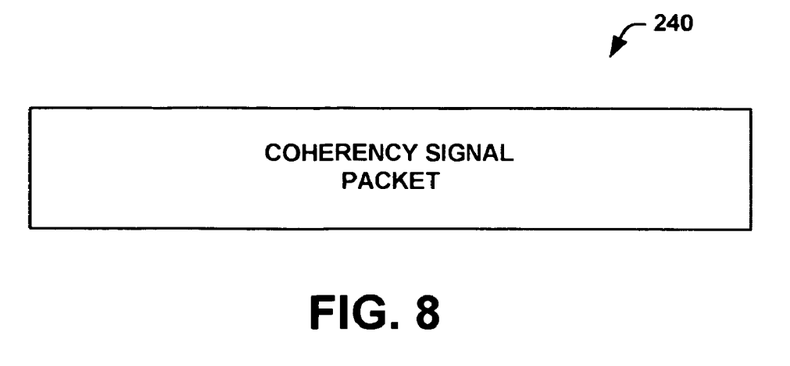
FIG. 8 depicts an example of a coherent signal packet.
Figure 9:
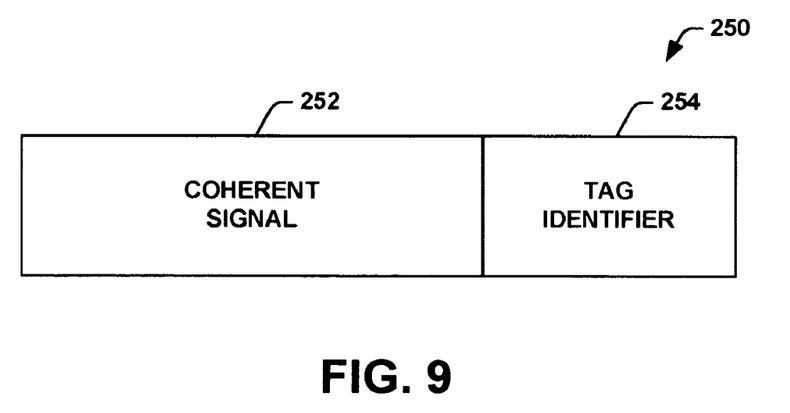
FIG. 9 depicts another example of a coherent signal packet.
Figure 10:
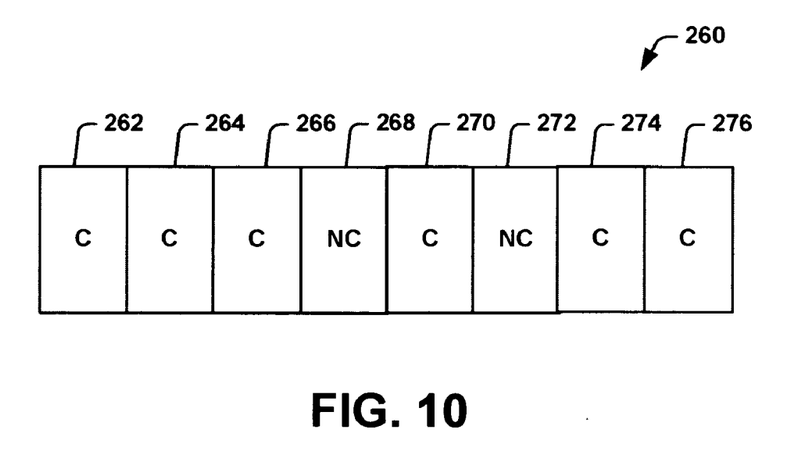
FIG. 10 depicts an example of a coherent signal mask or vector.

The coherent signal can be implemented in a number of different forms and structures. FIG. 8 illustrates a coherent signal packet 240. The coherent signal packet 240 is transmitted to a source in response to a source request prior to, after or concurrently with the coherent version of the data. The coherent signal packet 240 provides an indication that the prior, subsequent or current data fill returned by the system is the coherent version of the data fill. FIG. 9 illustrates a coherent signal packet 250 that includes a coherent signal portion 252 and a coherent tag identifier portion 254. In this embodiment, the system tags the different data fills returned by the system with different identifiers. The coherent packet 250 marks the coherent version by specifying the tag identifier associated with the coherent fill identifier in the coherent tag identifier portion 254 provided with the coherent signal packet 250.

FIG. 9 illustrates a coherent mask or coherent vector 260 that includes coherent identifiers 262-276 for different portions of a memory block. For example, a memory block associated with a given cache line includes one or more fields. Additionally, a memory block can be partitioned in to quantums. A typical quantum would be eight bytes for a 64 byte or 128 byte memory block associated with a given cache line. The coherent mask or coherent vector 260 includes a coherent identifier 262-276 for each quantum or field. The coherent identifier 262-276 is marked coherent (C) or not coherent (NC). The coherent mask or coherent vector can specify which fields or quantums that are coherent and/or which fields or quantums are now coherent that were not before. A similar structure can be employed to determine which of a plurality of data fills returned for a plurality of requests have returned coherent data. In this structure, each coherent identifier 262-276 represents a given source request with the state of the coherent identifier indicating which of the plurality of source requests have returned coherent copies associated with respective requests.

Figure 11:
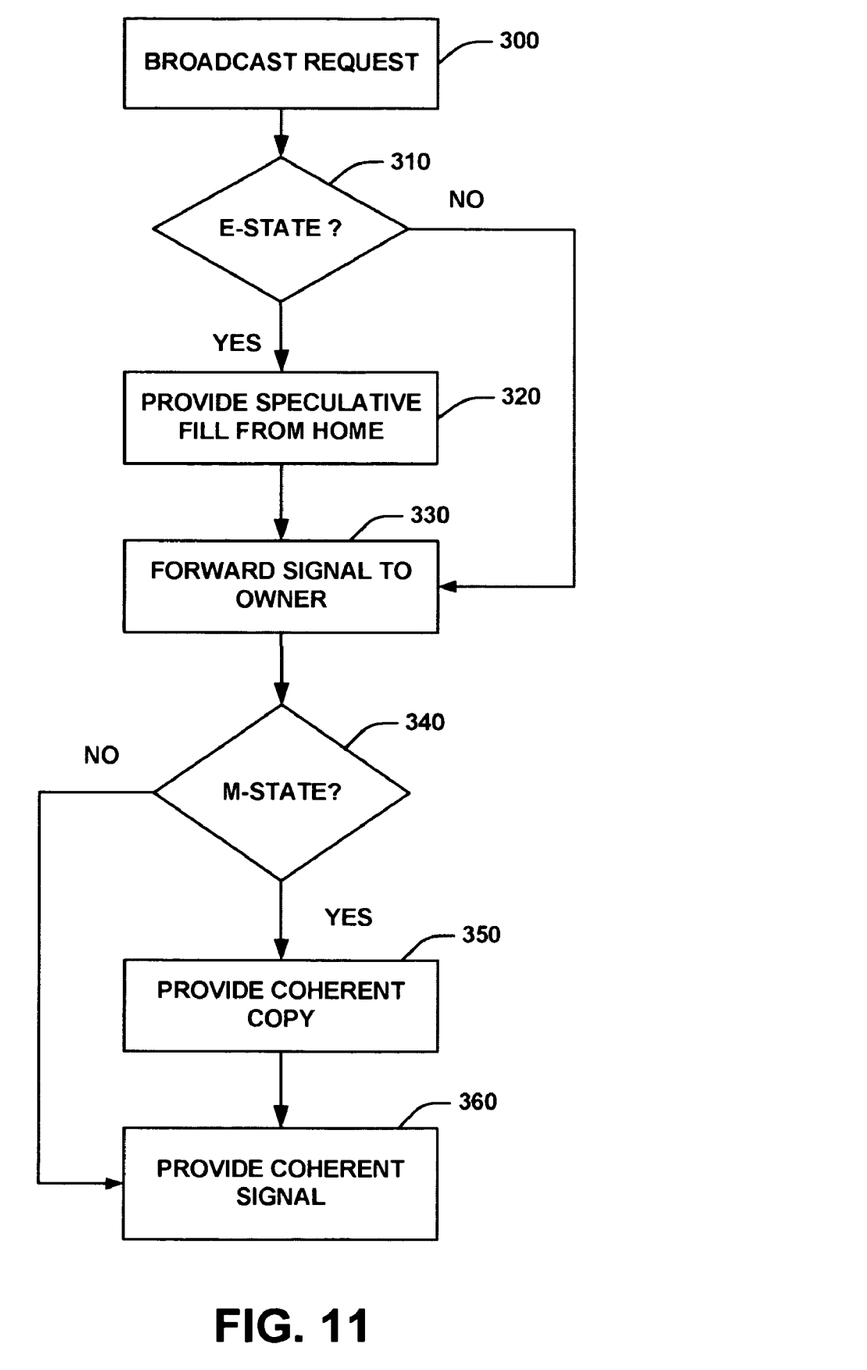
FIG. 11 depicts a flow diagram illustrating a method associated with a source request.
Figure 12:
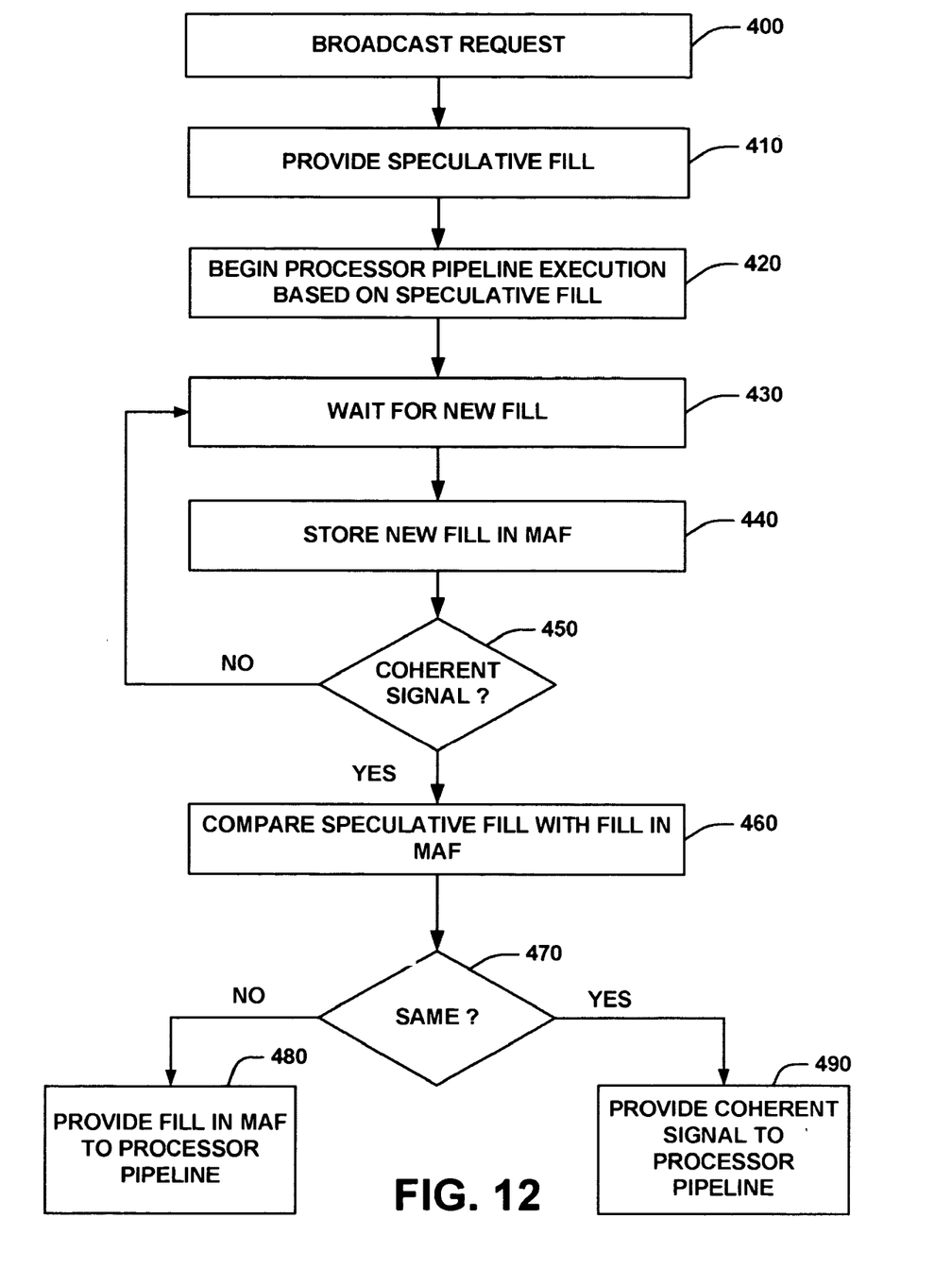
FIG. 12 depicts a flow diagram illustrating another method associated with a source request.
Figure 13:
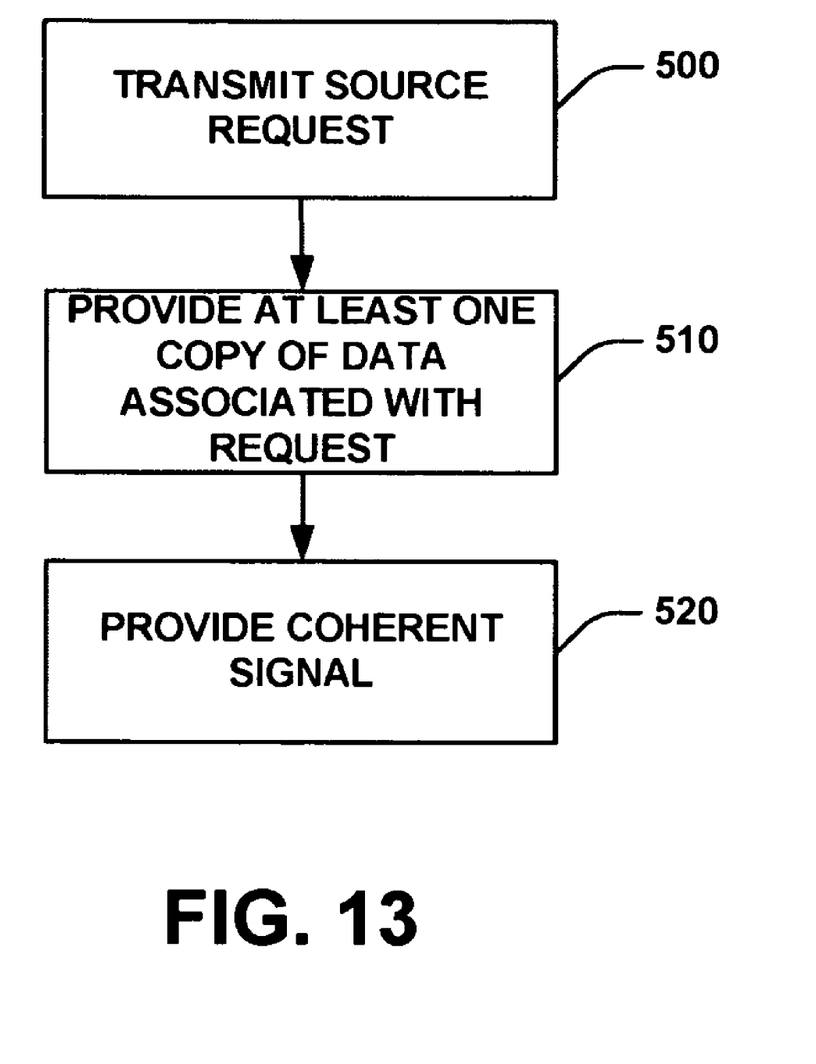
FIG. 13 depicts a flow diagram illustrating yet another method associated with a source request.

In view of the foregoing structural and functional features described above, certain methods will be better appreciated with reference to FIGS. 11-13. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 11 depicts a method that includes a source receiving a speculative fill from a home node when a cache line is in an exclusive (E) state. At 300, a source request is initiated, which is received by a home node. The home node retains information indicating the owner of the requested cache line. A home node can retain a copy of the requested cache line in addition to retaining owner information associated with the cache line. At 310, the home node determines if the requested copy of the cache line is in the E-state. If the requested cache copy is in the E-state (YES), a speculative fill is provided from the home to the source at 320. The methodology then proceeds to 330. If the requested cache copy is in not in the E-state (NO), the methodology proceeds directly to 330. At 330, the home provides a forward signal to the owner informing the owner of the broadcast request. The methodology then proceeds to 340.

At 340, it is determined whether or not the owner has modified the requested cache line. If the owner modifies the cache line (YES), the cache line is changed to the modify (M)-state. The methodology then proceeds to 350. At 350, the owner forwards a copy of the modified data fill (coherent copy) to the source. The methodology proceeds to 360, where the coherent signal is provided to the source. If the owner has not modified the data fill associated with the requested cache line (NO), the methodology proceeds to 360 directly where the coherent signal is provided to the source. The source knows that if a new fill is received with the coherent signal that the new fill is the coherent fill. The source also knows that if the coherent signal is received without a new fill, that the speculative fill is coherent. The source continues execution or backups execution accordingly without the need to compare the speculative fill with the coherent fill.

FIG. 12 depicts a method employing a speculative fill in the event of a local cache miss in a multi-processor system. At 400, a source request is initiated by a source node or processor in the event of a cache miss caused by a load or store instruction of a processor pipeline. At 410, a speculative fill is provided to the source. The source processor can receive speculative fills from a local processor (e.g., a member of a multi-processor group), or a remote processor (e.g., non-member of a multi-processor group). The speculative fill can also be provided by a speculative guess structure operative to provide speculative fills, such as a speculative engine (e.g., dedicated processor and/or memory) that returns speculative copies of cache lines. The speculative guess structure can be a storage structure local to the source processor that maintains speculative copies of cache lines in a table or some other form. The methodology then proceeds to 420. At 420, the source processor pipeline begins execution employing the speculative fill. The methodology then advances to 430.

At 430, the source waits for a new fill. Once the new fill is received, the new fill is stored in a MAF entry associated with the source request if it is different than the original speculative fill at 440. The source can ignore the new data fill. Alternatively, if the new data fill is different from the speculative fill used by the source processor to continue execution, the processor can backup and re-execute program instructions. This may be the case if it is determined that a subsequent fill is more likely coherent than the original fill employed by the processor to continue execution.

At 450, the source determines if a coherent signal has been received. For example, the source can determine if a coherent signal has been received by determining if a coherent flag residing in the MAF entry has changed state. If the coherent signal has not been received (NO), the methodology returns to 430 to wait for a new fill. If the coherent signal has been received (YES), the methodology proceeds to 460. At 460, the source compares the fill stored in the MAF entry (coherent fill) with the speculative fill provided to the processor pipeline.

At 470, the methodology determines if the speculative fill employed by the processor is the same as the coherent fill. If the speculative fill is not the same as the coherent fill (NO), the methodology proceeds to 480 to provide the fill from the MAF entry to the processor pipeline. If the speculative fill is the same as the coherent fill (YES), the methodology proceeds to 490 to provide the coherent signal to the processor pipeline. If the processor pipeline receives a new fill, the processor pipeline can back up and start executing again with the new data. If the processor pipeline receives a coherent signal without a new fill, the processor pipeline can continue executing.

FIG. 13 depicts a method for executing a source request. At 500, a source request for data is transmitted from a source node to other nodes of an associated multi-processor system. At 510, at least one copy of data is provided in response to the source request. At 520, a coherent signal is provided to the source node that indicates which of the at least one copy of data is coherent.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
   a plurality of data fills provided to a source processor from a plurality of processors of the multi-processor system in response to a source request for a data fill associated with a cache line and in response to a cache miss by the source processor, at least two of the plurality of data fills being speculative fills that are provided from at least two different processors;
   a coherent signal generated by the multi-processor system that provides an indication of which data fill of the plurality of data fills is the coherent data fill; and
   wherein the speculative fills are copies of the requested data fill that have an undetermined coherency states, the source processor continuing execution of program instructions employing a given speculative fill of the at least two speculative fills prior to receipt of the coherent signal.

2. The system of claim 1, the source processor continues executing program instructions if the coherent data fill is the same as the given speculative fill, the source processor re-executing program instructions if the coherent data fill is different from the given speculative fill.

3. The system of claim 1, the plurality of data fills comprising a first speculative fill and a subsequent speculative fill, the source processor continues executing program instructions if the subsequent speculative fill is the same as the first speculative fill, the source processor re-executing program instructions if the subsequent speculative fill is different from the first speculative fill.

4. The system of claim 1, wherein the coherent signal is provided by the multi-processor system by a coherent signal packet one of prior to, after and concurrently with a data fill indicated as coherent by the coherent signal.

5. The system of claim 1, the coherent signal being a coherent signal packet.

6. The system of claim 5, the coherent signal packet having a coherent signal indicator portion and a coherent tag identifier portion and each of the at least one data fills having a unique identifier, the coherent tag identifier portion specifying the unique identifier associated with the coherent data fill.

7. The system of claim 1, the coherent signal comprising a coherent mask that includes coherent identifiers associated with each of a plurality of portions of a data fill corresponding to the source request.

8. The system of claim 1, the source processor having a request engine that generates a miss address file (MAF) entry associated with the source request, the MAF entry having a data fill field and a coherent flack field that indicates if the coherent signal has been received by the source processor.

9. The system of claim 8, the request engine storing the latest data fill received by the source processor in the data fill field and changes the state of the coherent flag field in response to receipt of the coherent signal by the source processor.

10. The system of claim 9, further comprising a fill control component that retrieves a copy of the latest data fill associated with the coherent data fill in response to a change in state of the coherent flag and compares the copy of the coherent data fill with at least one of the at least two speculative fills provided to a processor pipeline associated with the source processor, the fill control component providing the copy of the coherent data fill to the processor pipeline if the at least one of the at least two speculative fills is not the same as the coherent data fill and providing the coherent signal to the processor pipeline if the at least one of the at least two speculative fills is the same as the coherent data fill.

11. The system of claim 1, further comprising:
a home node that receives the source request and provides a data fill to the source processor if a cache line associated with the source request is determined to be in an exclusive (E) state at the home node, the source processor executing program instructions with the data fill provided by the home node; and
an owner node that receives a forward signal from the home node in response to the source request, the owner forwarding a data fill to the source processor if the cache line associated with the source request has been changed to a modified (M) state at the owner node, and forwarding the coherent signal without a data fill to the source processor if the cache line associated with the source request has remained in the E-state at the owner node.

12. The system of claim 11, the source processor continuing to execute program instructions with the data fill provided by the home node if a coherent signal is received by the source processor without a data fill from the owner node, the source processor re-executes program instructions with the data fill provided by the owner node if a data fill is received by the source node.

13. A multi-processor system that conforms to a cache coherency protocol, the system comprising:
a plurality of processor nodes in communication with each other;
a source processor node that issues a source request to the system for a data fill associated with a cache line in response to a cache miss, and receives a plurality of data responses to the source request from two or more other processor nodes of the multi-processor system;
the system employing a protocol that causes the system to provide a coherent signal that indicates as to which of the plurality of data responses contains coherent data; and
the plurality of data responses comprising a plurality of speculative responses, the plurality of speculative responses comprising a first speculative response and a subsequent speculative response that are both copies of the requested data fill that have undetermined coherency states, the source processor continues execution of program instructions with at least one of the speculative responses until the coherent signal is received by the source processor, the source processor re-executing program instructions with coherent data if data employed by the program instructions from at least one of the plurality of speculative responses is not coherent, and the source processor re-executing program instructions with the one subsequent speculative response if data employed by the program instructions from the first speculative response is different from the subsequent speculative response.

14. The system of claim 13, the source processor generating a miss address file (MAF) entry associated with the source request, the MAF having a field for storing a last received data response of the plurality of data responses and a coherent flag that indicates if the coherent signal has been received by the source processor, the source processor employing the MAF entry to determine if data associated with the at least one of the plurality of the speculative responses employed by the program instructions is coherent.

15. The system of claim 13, the coherent signal comprising one of: a coherent signal packet; a coherent signal packet having a coherent signal indicator portion and a coherent tag identifier portion; and a coherent signal mask that includes coherent identifiers associated with each of a plurality of portions of a memory block corresponding to the source request.

16. A multi-processor system that employs a cache coherency protocol, the system comprising:
means for providing a plurality of data fills from a remote processors of the multi-processor system in response to a source request issued by a source processor for a data fill associated with a cache line in response to a cache miss, the plurality of data fills comprising at least two speculative data fills from two different processors, wherein the at least two speculative data fills are copies of the requested data fill that have undetermined coherency states;
means for executing program instructions associated with the source processor employing a given speculative data fill of the at least two speculative data fills prior to determining which of the plurality of data fills has coherent data; and
means for providing a coherent signal that indicates which of the plurality of data fills has coherent data.

17. The system of claim 16, further comprising means for determining whether data utilized by the program instructions is coherent in response to receipt of the coherent signal by the source processor, the means for executing program instructions re-executing instructions employing coherent data if the means for determining determines that the data utilized by the program instructions is not coherent.

18. A method comprising:
transmitting a source request for data from a source node to other nodes of an associated multi-processor system in response to a cache miss;
providing a plurality of copies of data from a plurality of the other nodes in response to the source request;
providing a coherent signal to the source node that indicates which of the plurality of copies of data is coherent; and
wherein the plurality of copies of data comprises at least two speculative copies of data from at least two other nodes, the speculative copies of the data being copies of the requested data that have undetermined coherency states, the source node continuing execution of program instructions employing a given speculative copy of data of the at least two speculative copies of data prior to receipt of the coherent signal.

19. The method of claim 18, wherein the at least two speculative copies of data comprises a first speculative copy of data and at least one additional speculative copy of data, and the providing the plurality of copies of data in response to the source request comprising providing the at least one additional speculative copy of data prior to providing the coherent copy of data, the source node continuing executing program instructions if the at least one additional speculative copy of data is the same as the first speculative copy of data, the source processor re-executing program instructions if the at least one additional speculative copy of data is different from the first speculative copy of data.

20. The method of claim 18, the source node continuing executing program instructions if a coherent copy of data indicated as coherent by the coherent signal is the same as the given speculative copy of data, the source processor re-executing program instructions if the coherent copy of data indicated as coherent by the coherent signal is different from the given speculative copy of data.

21. The method of claim 18, the providing a coherent signal to the source node comprising providing a coherent signal packet one of prior to, after and concurrently with a coherent copy of data.

22. The method of claim 18, the coherent signal comprising one of: a coherent signal packet; a coherent signal packet having a coherent signal indicator portion and a coherent tag identifier portion that specifies which of the at least one copy of data is coherent; and a coherent mask that includes coherent identifiers associated with each of a plurality of portions of a memory block corresponding to the source request.

23. The method of claim 18, further comprising:
generating a miss address file (MAF) entry associated with the source request;
storing a copy of data received by the source node in response to the source request in a first field in the MAF entry;
monitoring a state of the coherent flag in a second field of the MA F to determine if the coherent signal has been received; and
repeatedly overwriting the copy of data in the first field with a latest copy of data received in response to the source request, until the coherent flag has changed states.

24. The method of claim 23, further comprising:
retrieving the latest copy of data in the first field in response to a change in state of the coherent flag;
comparing the latest copy of data in the first field with the given speculative copy of data provided to a processor pipeline associated with the source node;
providing the latest copy of data to the processor pipeline if the latest copy of data is the different from the given speculative copy of data; and
providing the coherent signal to the processor pipeline if the latest copy of data is the same as the given speculative copy of data.

25. The method of claim 18, further comprising:
receiving the source request at a home node;
providing the given speculative copy of data to the source node if the cache line associated with the source request is determined to be in an exclusive (E)-state at the home node;
forwarding the source request to an owner node;
providing a coherent copy of data to the source node if the cache line associated with the source request has been changed to a modified (M) state at the owner node; and
providing the coherent signal without a coherent copy of data to the source node if the cache line associated with the source request has remained in the E-state at the owner node.

26. The method of claim 18, wherein each of the other nodes comprises a processor with an associated cache.

* * * * *

UNITED STATES PATENT AND TRADEMARK OFFICE
CERTIFICATE OF CORRECTION

| | | |
|---|---|---|
| PATENT NO. | : 7,376,794 B2 | |
| APPLICATION NO. | : 10/756636 | |
| DATED | : May 20, 2008 | |
| INVENTOR(S) | : Simon C. Steely, Jr. et al. | |

It is certified that error appears in the above-identified patent and that said Letters Patent is hereby corrected as shown below:

On the Title Page on page 2, in field (56), under "Other Publications", in column 2, line 8, delete "shaped" and insert -- shared --, therefor.

On the Title Page on page 2, in field (56), under "Other Publications", in column 2, line 23, delete "Standard" and insert -- Stanford --, therefor.

In column 13, line 4, in Claim 8, delete "flack" and insert -- flag --, therefor.

In column 14, line 7, in Claim 13, after "the" delete "one".

In column 14, line 29, in Claim 16, after "from" delete "a".

In column 16, line 2, in Claim 23, delete "MA F" and insert -- MAF --, therefor.

Signed and Sealed this

Fifth Day of August, 2008

JON W. DUDAS
*Director of the United States Patent and Trademark Office*